United States Patent
Yamakawa et al.

(10) Patent No.: US 11,658,806 B2
(45) Date of Patent: May 23, 2023

(54) IDENTITY-BASED HASH PROOF SYSTEM CONFIGURATION APPARATUS, IDENTITY-BASED ENCRYPTION APPARATUS, IDENTITY-BASED HASH PROOF SYSTEM CONFIGURATION METHOD AND PROGRAM

(71) Applicant: NIPPON TELEGRAPH AND TELEPHONE CORPORATION, Tokyo (JP)

(72) Inventors: Takashi Yamakawa, Musashino (JP); Ryo Nishimaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 271 days.

(21) Appl. No.: 17/267,113

(22) PCT Filed: Jun. 21, 2019

(86) PCT No.: PCT/JP2019/024798
§ 371 (c)(1),
(2) Date: Feb. 9, 2021

(87) PCT Pub. No.: WO2020/044748
PCT Pub. Date: Mar. 5, 2020

(65) Prior Publication Data
US 2021/0167945 A1    Jun. 3, 2021

(30) Foreign Application Priority Data

Aug. 28, 2018 (JP) .............................. JP2018-159768

(51) Int. Cl.
*H04L 9/06*  (2006.01)
*H04L 9/08*  (2006.01)

(52) U.S. Cl.
CPC .......... *H04L 9/0643* (2013.01); *H04L 9/0825* (2013.01); *H04L 9/0869* (2013.01)

(58) Field of Classification Search
None
See application file for complete search history.

(56) References Cited

U.S. PATENT DOCUMENTS 10,686,604 B2 * 6/2020 Saito .................... H04L 63/0876
2013/0028415 A1 * 1/2013 Takashima ............ H04L 9/0869
380/28

(Continued)

OTHER PUBLICATIONS

Chow, Sherman SM, et al. "Practical leakage-resilient identity-based encryption from simple assumptions." Proceedings of the 17th ACM conference on Computer and communications security. 2010. (Year: 2010).*

(Continued)

*Primary Examiner* — Bassam A Noaman
(74) *Attorney, Agent, or Firm* — IPUSA, PLLC (57) ABSTRACT

An ID-based hash proof system configuration apparatus includes a processor, and a memory storing program instructions that cause the processor to receive a security parameter, and output a public parameter and a master private key by using a multi identity-based encryption (MIBE) setup algorithm and a key K randomly selected, receive the public parameter, the master private key, and an identifier, and output a private key by using a bit value $r_i$ ($1 \leq i \leq n$) that is selected, and a MIBE key generation algorithm, receive the public parameter and the identifier, and output a ciphertext and a key k by using a MIBE encryption algorithm, receive the public parameter and the identifier, and output a wrong ciphertext by using the MIBE encryption algorithm, and receive the public parameter, the private key, the identifier, and the ciphertext, and output the key k by using a MIBE decryption algorithm.

6 Claims, 3 Drawing Sheets

(56) References Cited

U.S. PATENT DOCUMENTS

| | | | | |
|---|---|---|---|---|
| 2014/0298028 A1* | 10/2014 | Takashima | ............ | H04L 9/0822 |
| | | | | 713/171 |
| 2016/0133164 A1* | 5/2016 | Yoshida | .................. | H04L 9/008 |
| | | | | 713/189 |
| 2019/0201143 A1* | 7/2019 | Shelton, IV | ..... | A61B 17/07207 |

OTHER PUBLICATIONS

Yu Chen, Zongyang Zhang, Dongdai Lin, Zhenfu Cao, CCA-Secure IB-KEM from Identity-Based Extractable Hash Proof System, The Computer Journal, vol. 57, Issue 10, Oct. 2014, pp. 1537-1556 (Year: 2014).*

Joel Alwen, Yevgeniy Dodis, Moni Naor, Gil Segev, Shabsi Walfish, and Daniel Wichs. Public-key encryption in the bounded-retrieval model. In Henri Gilbert, editor, EUROCRYPT 2010, vol. 6110 of LNCS, pp. 113-134. Springer, Heidelberg, May 2010.

* cited by examiner

IDENTITY-BASED HASH PROOF SYSTEM CONFIGURATION APPARATUS, IDENTITY-BASED ENCRYPTION APPARATUS, IDENTITY-BASED HASH PROOF SYSTEM CONFIGURATION METHOD AND PROGRAM

TECHNICAL FIELD

The present invention relates to an ID-based hash proof system configuration apparatus, an ID-based encryption apparatus, an ID-based hash proof system configuration method, and a program.

BACKGROUND ART

A concept referred to as an ID-based hash proof system (hereinafter also referred to as an identity-based hash proof system (IB-HPS)) has been known (see Non Patent Literature (NPL) 1, for example). The description of NPL 1 suggests that ID-based encryption can be configured by using the IB-HPS, and that the configuration satisfies key leakage-resilience. The key leakage-resilience refers to safety greater than usual, which prevents safety from being endangered even if a part of a private key is leaked. In the actual world, completely privately storing a private key is difficult, and it is thus desirable that key leakage-resilience be achieved.

The description disclosed in NPL 1 suggests that the key leakage-ratio, i.e., a ratio enabling prevention of endangerment of safety even if a part of a private key is leaked, be substantially equal to a parameter referred to as a universality-ratio of the IB-HPS as a component.

Here, among conventional configuration methods of the IB-HPS, methods that achieve an optimal universality-ratio, i.e., that achieve a universality-ratio of substantially 1, use a heuristic model, referred to as a random oracle, for proof of safety.

CITATION LIST

Non Patent Literature

NPL 1: Joël Alwen, Yevgeniy Dodis, Moni Naor, Gil Segev, Shabsi Walfish, and Daniel Wichs. Public-key encryption in the bounded-retrieval model. In Henri Gilbert, editor, EUROCRYPT 2010, volume 6110 of LNCS, pages 113-134. Springer, Heidelberg, May 2010.

SUMMARY OF THE INVENTION

Technical Problem

However, the random oracle is such a heuristic model that an actual hash function is regarded as a true random function, and proof of safety using the model thus may not invariably ensure safety in the actual world. For this reason, to ensure sufficient safety in the actual world, it is desirable that proof of safety be achieved without using a random oracle.

An embodiment of the present invention is made in light of the circumstances described above, and has an object to configure an ID-based hash proof system having an optimal universality-ratio without using a random oracle.

Means for Solving the Problem

To achieve the object mentioned above, an embodiment of the present invention includes: a setup means of taking an input of a security parameter $1^\lambda$, and outputting a public parameter pp and a master private key (msk, K) by using a setup algorithm $\text{Setup}_{MIBE}$ and a key K, the setup algorithm $\text{Setup}_{MIBE}$ including a setup algorithm $\text{Setup}_{IPE}$ for inner-product encryption, the key K being randomly selected from a key space of a pseudorandom function PRF; a key generation means of taking an input of the public parameter pp, the master private key (msk, K), and an identifier id, and outputting a private key $sk_{id} = (sk_{id}', \{r_i\}_{i \in [n]})$ by using a bit value $r_i$ ($1 \le i \le n$) that is selected, a key generation algorithm $\text{KeyGen}_{MIBE}$, and the pseudorandom function PRF, the bit value $r_i$ ($1 \le i \le n$) being one of n bit values $r_i$ ($1 \le i \le n$) randomly selected from $\{0, 1\}$, the key generation algorithm $\text{KeyGen}_{MIBE}$ including a key generation algorithm $\text{KeyGen}_{IPE}$ for the inner-product encryption, the private key $sk_{id} = (sk_{id}', \{r_i\}_{i \in [n]})$ being configured by using an output $sk_{id}'$ of the key generation algorithm $\text{KeyGen}_{MIBE}$ and the bit value $r_i$ ($1 \le i \le n$); an encapsulation means of taking an input of the public parameter pp and the identifier id, and outputting a ciphertext ct and a key k by using an encryption algorithm $\text{Enc}_{MIBE}$ including an encryption algorithm $\text{Enc}_{IPE}$ for the inner-product encryption; a wrong encapsulation means of taking an input of the public parameter pp and the identifier id, and outputting a wrong ciphertext ct' by using the encryption algorithm $\text{Enc}_{MIBE}$; and a decryption means of taking an input of the public parameter pp, the private key $sk_{id}$, the identifier id, and the ciphertext ct, and outputting the key k by using a decryption algorithm $\text{Dec}_{MIBE}$ including a decryption algorithm $\text{Dec}_{IPE}$ for the inner-product encryption.

Effects of the Invention

The ID-based hash proof system having an optimal universality-ratio can be configured without using a random oracle.

DESCRIPTION OF EMBODIMENTS

An embodiment of the present invention will be described below. The embodiment of the present invention will provide a description of an ID-based hash proof system configuration apparatus 10 that configures an ID-based hash proof system having an optimal universality-ratio without using a random oracle.

The embodiment of the present invention will herein provide a description of a case of configuring an IB-HPS by using inner-product encryption (hereinafter also referred to as IPE). In this case, as an intermediate product, multi ID-based encryption (hereinafter also referred to as multi identity-based encryption (MIBE)) is configured. In light of this, first, definition of the IB-HPS, the IPE, and the MIBE will be described.

1. Definition

1-1. IB-HPS

The IB-HPS consists of a set of algorithms (Setup, KeyGen, Encap, Encap*, Decap). Note that, for details of the IB-HPS, refer to NPL 1 described above, for example.

Setup($1^\lambda$): This is a setup algorithm. This algorithm takes an input of a security parameter $1^\lambda$, and outputs a public parameter pp and a master private key msk. Note that, for the sake of simplicity of description, the following description assumes that each of the following algorithms KeyGen, Encap, Encap*, and Decap implicitly takes an input of the public parameter pp.

KeyGen(msk, id): This is a key generation algorithm. This algorithm takes an input of the master private key msk and an ID (hereinafter also referred to as an identifier) id, and outputs a private key $sk_{id}$.

Encap(id): This is an encapsulation algorithm. This algorithm takes an input of the identifier id, and outputs a ciphertext ct and a key k.

Encap*(id): This is a wrong encapsulation algorithm. This algorithm takes an input of the identifier id, and outputs a wrong ciphertext ct'.

Decap($sk_{id}$, id, ct): This is a decryption algorithm. This algorithm takes an input of the private key $sk_{id}$, the identifier id, and the ciphertext ct, and outputs a key k.

Here, the IB-HPS is required to satisfy the following three properties, which are validity, ciphertext indistinguishability, and universality.

Validity: When the ciphertext ct generated for the identifier id by using the encapsulation algorithm Encap is decrypted by using the private key $sk_{id}$ corresponding to the identifier id, the correct key k is obtained.

Ciphertext indistinguishability: The ciphertext generated by using the encapsulation algorithm Encap and the ciphertext generated by using the wrong encapsulation algorithm Encap* are quantitatively indistinguishable.

Universality: There are a great number of candidates for the private key $sk_{id}$ corresponding to a single identifier id. Decrypted results of the wrong ciphertext ct' that are generated by using the wrong encapsulation algorithm Encap* depend on a factor as to which private key $sk_{id}$ is used for the decryption.

1-2. IPE

The IPE consists of a set of algorithms (Setup, KeyGen, Enc, Dec). For the details of the IPE, refer to the following reference document 1, for example.

Reference Document 1

Jonathan Katz, Amit Sahai, and Brent Waters. Predicate encryption supporting disjunctions, polynomial equations, and inner products. In Nigel P. Smart, editor, EUROCRYPT 2008, volume 4965 of LNCS, pages 146-162. Springer, Heidelberg, April 2008.

Setup($1^\lambda$, $1^n$): This is a setup algorithm. This algorithm takes an input of a security parameter $1^\lambda$ and a dimensionality $1^n$, and outputs a public parameter pp and a master private key msk. The public parameter pp specifies a vector space as expressed by the following expression (that is, the public parameter pp includes a natural number q).

$$V^n := \mathbb{Z}_q^n \quad \text{[Math. 1]}$$

Note that, for the sake of simplicity of description, the following description assumes that each of the following algorithms KeyGen, Enc, and Dec implicitly takes an input of the public parameter pp.

KeyGen(msk, y): This is a key generation algorithm. This algorithm takes an input of the master private key msk and a vector $y \in V^n$, and outputs a private key $sk_y$ corresponding to the vector y.

Enc(x, m): This is an encryption algorithm. This algorithm takes an input of a vector $x \in V^n$ and a plaintext m, and outputs a ciphertext ct.

Dec($sk_y$, y, ct): This is a decryption algorithm. This algorithm takes an input of the private key $sk_y$, the vector $y \in V^n$, and the ciphertext ct, and outputs a plaintext m.

Here, the IPE is required to satisfy the following two properties, which are validity and safety.

Validity: If the inner product <x, y> is 0, the ciphertext corresponding to the vector x (that is, the ciphertext ct generated by using Enc(x, m)) can be correctly decrypted into the plaintext m by using the private key $sk_y$ corresponding to the vector y.

Safety: If the inner product <x, y> is not 0, the ciphertext corresponding to the vector x and the private key $sk_y$ corresponding to the vector y conceal the plaintext.

1-3. MIBE

The MIBE consists of a set of algorithms (Setup, KeyGen, Enc, Dec). Note that the MIBE is a formulation introduced in the embodiment of the present invention.

Setup($1^\lambda$, $1^n$): This is a setup algorithm. This algorithm takes an input of a security parameter $1^\lambda$ and an ID multiplicity $1^n$, and outputs a public parameter pp and a master private key msk. Note that, for the sake of simplicity of description, the following description assumes that each of the following algorithms KeyGen, Enc, and Dec implicitly takes an input of the public parameter pp.

Here, Setup is a randomized algorithm (also referred to as a probabilistic algorithm). The operation of the randomized algorithm Alg( ) of taking an input of a certain value a and outputting a certain value b is expressed as:

$$\text{Alg}(a) \xrightarrow{R} b \text{ or } b \xleftarrow{R} \text{Alg}(a) \quad \text{[Math. 2]}$$

This operation is expressed as "Alg(a)$_R$→b" or "b←$_R$Alg(a)" in the following description of this Specification. In contrast, the operation of a deterministic algorithm Alg( ) of taking an input of a certain value a and outputting a certain value b is expressed as "Alg(a)→b" or "b←Alg(a)".

Accordingly, the above-described setup algorithm is expressed as Setup ($1^\lambda$, $1^n$)$_R$→(pp, msk).

KeyGen(msk, ($id_1$, . . . , $id_n$)): This is a key generation algorithm. This algorithm takes an input of a master key msk and a set of identifiers ($id_1$, . . . , $id_n$), and outputs a private key expressed in the following expression.

$$sk_{(id_1, \ldots, id_n)} \quad \text{[Math. 3]}$$

Note that, in the description of this Specification, each $id_j$ (j=1, . . . , n) that is included in the set of identifiers ($id_1$, . . . , $id_n$) serving as a suffix of the private key is represented by "idj". Accordingly, in the description of this Specification, the above-described private key generated by using the key generation algorithm KeyGen is represented by $sk_{(id1, \ldots, idn)}$.

Here, KeyGen is a randomized algorithm, and is expressed as:

$$\text{KeyGen}(msk, (id_1, \ldots, id_n)) \xrightarrow{R} sk_{(id_1, \ldots, id_n)} \quad \text{[Math. 4]}$$

Enc(id, m): This is an encryption algorithm. This algorithm takes an input of the identifier id and a plaintext m, and outputs a ciphertext ct. Here, Enc is a randomized algorithm and is expressed as Enc(id, m)$_R$→ct. Note that the relationship between the identifier id and the suffix "idj" will be described later.

Dec(sk$_{(id1, \ldots, idn)}$, (id$_1$, . . . , id$_n$), ct): This is a decryption algorithm. This algorithm takes an input of the private key sk$_{(id1, \ldots, idn)}$, the set of identifiers (id$_1$, . . . , id$_n$), and the ciphertext ct, and outputs a plaintext m. Here, Dec is a deterministic algorithm and is expressed as Dec (sk$_{(id1, \ldots, idn)}$, (id$_1$, . . . , id$_n$), ct)→m.

Here, the MIBE is required to satisfy the following two properties, which are validity and safety.

Validity: If id∈{id$_1$, . . . , id$_n$} is true, the ciphertext corresponding to the identifier id (that is, the ciphertext ct generated by using Enc(id, m)) can be correctly decrypted into the plaintext by using the private key sk$_{id1, \ldots, idn)}$, corresponding to the set of identifiers (id$_1$, . . . , id$_n$).

Safety: If id∈{id$_1$, . . . , id$_n$} is not true, the ciphertext corresponding to the identifier id and the private key sk$_{(id1, \ldots, idn)}$ corresponding to the set of identifiers (id$_1$, . . . , id$_n$) conceal the plaintext.

2. Configuration of MIBE Using IPE

The following will provide a description of a method of configuring the MIBE defined in 1-3 described above by using the IPE defined in 1-2 described above, as a preliminary step for configuring the IB-HPS by using the MIBE. In the following description, a set of algorithms of the IPE defined in 1-2 described above is represented by (Setup$_{IPE}$, KeyGen$_{IPE}$, Enc$_{IPE}$, Dec$_{IPE}$), and a set of algorithms of the MIBE configured by using the IPE is represented by (Setup$_{MIBE}$, KeyGen$_{MIBE}$, Enc$_{MIBE}$, Dec$_{MIBE}$).

An operator who carries out the present application configures the set of algorithms of the MIBE (Setup$_{MIBE}$, KeyGen$_{MIBE}$, Enc$_{MIBE}$, Dec$_{MIBE}$) by using the set of algorithms of the IPE (Setup$_{IPE}$, KeyGen$_{IPE}$, Enc$_{IPE}$, Dec$_{IPE}$) as in the following procedure.

Setup$_{MIBE}$(1$^\lambda$, 1$^n$) (pp, msk)←$_R$Setup$_{IPE}$(1$^\lambda$, 1$^{n+1}$) is generated, and then (pp, msk) is output. If the public parameter pp specifies a vector space V$^{n+1}$ as the IPE, an ID space of the MIBE is set as:

$$V = \mathbb{Z}_q \quad \text{[Math. 5]}$$

KeyGen$_{MIBE}$(msk, id$_1$, . . . , id$_n$)∈V$^n$): First, {y$_i$∈V}$_{i \in \{0, \ldots, n\}}$, that lets a variable X satisfy the following equation is calculated to obtain y:=(y$_0$, . . . , y$_n$)∈V$^{n+1}$.

$$\Pi_{i=1}^n (X - id_n) = \Sigma_{i=0}^n y_i X^i \quad \text{[Math. 6]}$$

Then, sk$_y$←$_R$KeyGen$_{IPE}$(msk, y) is generated, and sk$_{(id1, \ldots, idn)}$:=sk$_y$ is output.

Enc$_{MIBE}$(id, m):x:=(1, id, id$^2$, . . . , i$^n$) is set with id$^i$ being the i-th bit of the id, ct←$_R$Enc$_{IPE}$(x, m) is generated, and the ciphertext ct is output.

Dec$_{MIBE}$(sk$_{(id1, \ldots, idn)}$, (id$_1$, . . . , id$_n$), ct): y∈V$^{n+1}$ is generated in a manner similar to KeyGen$_{MIBE}$, m←$_R$Dec$_{IPE}$(sk$_{(id1, \ldots, idn)}$, y, ct) is calculated, and the plaintext m is output.

3. Configuration of IB-HPS Using MIBE

The following will provide a description of a method of configuring the IB-HPS by using the MIBE. In the following description, a set of algorithms of the IB-HPS defined in 1-1 described above is represented by (Setup$_{HPS}$, KeyGen$_{HPS}$, Encap$_{HPS}$, Encap$_{HPS}$*, Decap$_{HPS}$), and the set of algorithms is configured by using the MIBE configured in 2 described above.

An operator who carries out the present invention configures the set of algorithms of the IB-HPS (Setup$_{HPS}$, KeyGen$_{HPS}$, Encap$_{HPS}$, Encap$_{HPS}$*, Decap$_{HPS}$) by using the set of algorithms of the MIBE (Setup$_{MIBE}$, KeyGen$_{MIBE}$, Enc$_{MIBE}$, Dec$_{MIBE}$) as in the following procedure. Here, a message space of the MIBE includes {0, 1}$^L$, where L represents the length of the key k output by Encap$_{HPS}$ and Decap$_{HPS}$. Further, PRF represents a pseudorandom function, and n represents a parameter of an integer value. Note that, in the following description, a||b represents connection between bit streams a and b, and bin(c) with respect to an integer c represents a bit stream of c.

Setup$_{HPS}$(1$^\lambda$): (pp, msk)←$_R$Setup$_{MIBE}$(1$^\lambda$, 1$^n$) and the parameter as expressed by the following expression are generated, and the public parameter pp and the master private key (msk, K) are output.

$$K \xleftarrow{R} K \quad \text{[Math. 7]}$$

where K represents a key space of a pseudorandom function PRF.

Here, let S be an arbitrary set. The operation of randomly selecting an element s out of the set S is expressed as:

$$S \xrightarrow{R} s \text{ or } s \xleftarrow{R} S \quad \text{[Math. 8]}$$

This operation is expressed as "S$_R$→s" or "s←$_R$S" in the following description of this Specification. Note that, for the sake of simplicity of description, the following description assumes that each of the following algorithms KeyGen$_{HPS}$, Encap$_{HPS}$, Encap$_{HPS}$*, and Decap$_{HPS}$ implicitly takes an input of the public parameter pp.

KeyGen$_{HPS}$((msk, K), id): The parameter as expressed by the following expression is generated for i∈[n], with r$_i$ satisfying "r$_i$←$_R${0, 1}".

$$sk'_{id} \xleftarrow{R} \text{KeyGen}_{MIBE}(msk,(id\|bin(1)\|r_1, \ldots, id\|bin(n)\|r_n);PRF(K,id)) \quad \text{[Math. 9]}$$

Then, the parameter as expressed by the following expression is output.

$$sk_{id} := (sk'_{id}, \{r_i\}_{i \in [n]}) \quad \text{[Math. 10]}$$

Note that [n]={1, . . . , n}.

Encap$_{HPS}$(id): k$_i$∈{0, 1}$^L$ is generated for i∈[n] and ct$_{i, b}$←$_R$Enc$_{MIBE}$(id||bin(i)||b, k$_i$) is generated for i∈[n] and b∈E{0, 1} to obtain the parameter as expressed by the following expression.

$$ct := \{ct_{i,b}\}_{i \in [n], b \in \{0,1\}} \text{ and } k := \oplus_{i \in [n]} k_i \quad \text{[Math. 11]}$$

Then, (ct, k) is output. Note that the symbol expressed in the following expression represents an exclusive-or for each bit.

$$\oplus \quad \text{[Math. 12]}$$

Encap$_{HPS}$*(id): k$_{i, b}$∈{0, 1}$^L$ and ct$_{i, b}$←$_R$Enc$_{MIBE}$(id||bin (i)||b, k$_{i,b}$) are generated for i∈[n] and b∈{0, 1} to obtain ct':={ct$_{i, b}$}$_{i \in [n], b \in \{0,1\}}$, and ct' is output.

Decap$_{HPS}$(sk$_{id}$, id, ct): sk$_{id}$ is decomposed as expressed by (sk$_{id}'$, {r$_i$}$_{i \in [n]}$)←sk$_{id}$, and ct is decomposed as expressed by {ct$_{i, b}$}$_{i \in [n], b \in \{0,1\}}$←ct to generate the parameter as expressed by the following expression.

$$k'_i \leftarrow Dec_{MIBE}(sk'_{id},(id\|bin(1)\|r_1, \ldots, id\|bin(n)\|r_n), ct_{i,r_i}) \quad \text{[Math. 13]}$$

Then, the parameter as expressed by the following expression is output.

$$k := \oplus_{i \in [n]} k'_i \quad \text{[Math. 14]}$$

Through the procedure described above, an IB-HPS having an optimal universality-ratio (that is, an IB-HPS having a universality-ratio of substantially 1) is configured.

Here, the universality-ratio is expressed by a ratio between universality and the size of a private key. In the IB-HPS configured by using the MIBE of 3 described above, the private key $sk_{id}$ output by $KeyGen_{HPS}$ is expressed as $(sk_{id}', \{r_i\}_{n \in [n]})$, and accordingly there are $2^n$ candidates for the private key $sk_{id}$ corresponding to a single identifier id. Thus, universality is expressed as $\log_2 2^n = n$. Further, the size of the private key $sk_{id}$ is the sum of the size of $sk_{id}'$ and the size of $\{r_i\}_{n \in [n]}$. Accordingly, the size of the private key $sk_{id}$ is expressed as $|sk_{id}'|+n$, where $|sk_{id}'|$ represents the size of $sk_{id}'$.

Thus, the universality-ratio of the IB-HPS configured by using the MIBE of 3 described above is expressed as $n/(|sk_{id}'|+n)$. This expression brings the universality-ratio to substantially 1 if a sufficient large value is substituted into the parameter n. Consequently, by virtue of the IB-HPS configured by using the MIBE of 3 described above, an operator who carries out the present invention is enabled to configure ID-based encryption having an optimal key leakage-ratio without using a random oracle.

4. Functional Configuration of ID-Based Hash Proof System Configuration Apparatus 10

Figure 1:
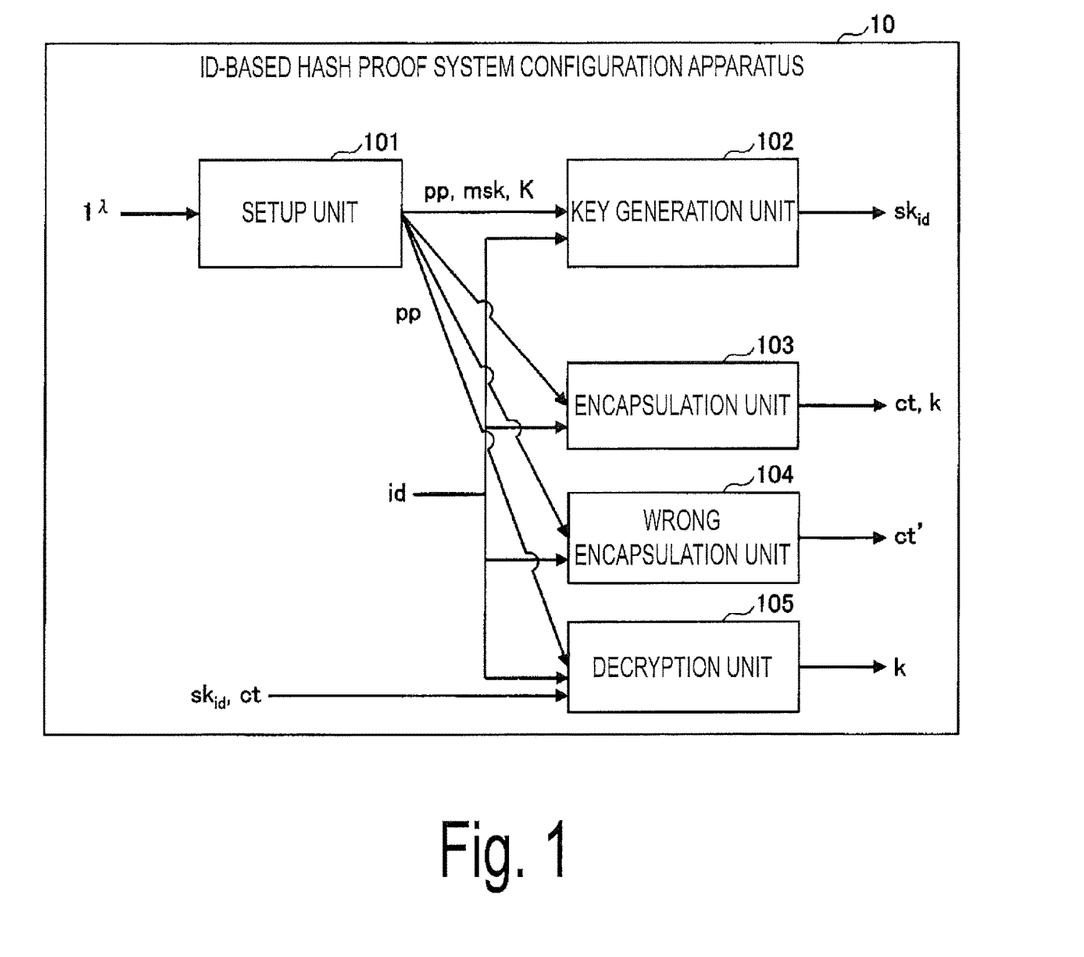
FIG. 1 is a diagram illustrating an example of a functional configuration of an ID-based hash proof system configuration apparatus according to an embodiment of the present invention.

With reference to FIG. 1, the following will provide a description of a functional configuration of the ID-based hash proof system configuration apparatus 10 according to the present invention. The apparatus configures the ID-based hash proof system (IB-HPS) having an optimal universality-ratio by executing each of the algorithms of the IB-HPS configured by using the MIBE of 3 described above. FIG. 1 is a diagram illustrating an example of a functional configuration of the ID-based hash proof system configuration apparatus 10 according to the embodiment of the present invention.

As illustrated in FIG. 1, the ID-based hash proof system configuration apparatus 10 according to the embodiment of the present invention includes a setup unit 101, a key generation unit 102, an encapsulation unit 103, a wrong encapsulation unit 104, and a decryption unit 105.

The setup unit 101 takes an input of the security parameter $1^\lambda$ to execute $Setup_{HPS}$, and outputs the public parameter pp and the master private key (msk, K).

The key generation unit 102 takes an input of the public parameter pp, the master private key (msk, K), and the identifier id to execute $KeyGen_{HPS}$, and outputs the private key $sk_{id}$.

The encapsulation unit 103 takes an input of the public parameter pp and the identifier id to execute $Encap_{HPS}$, and outputs (ct, k). Note that ct represents a ciphertext, and k represents a key.

The wrong encapsulation unit 104 takes an input of the public parameter pp and the identifier id to execute $Encap_{HPS}*$, and outputs the wrong ciphertext ct'.

The decryption unit 105 takes an input of the public parameter pp, the private key $sk_{id}$, the identifier id, and the ciphertext ct, and outputs the key k.

5. Procedure of Processing Executed by ID-Based Hash Proof System Configuration Apparatus 10

Figure 2:
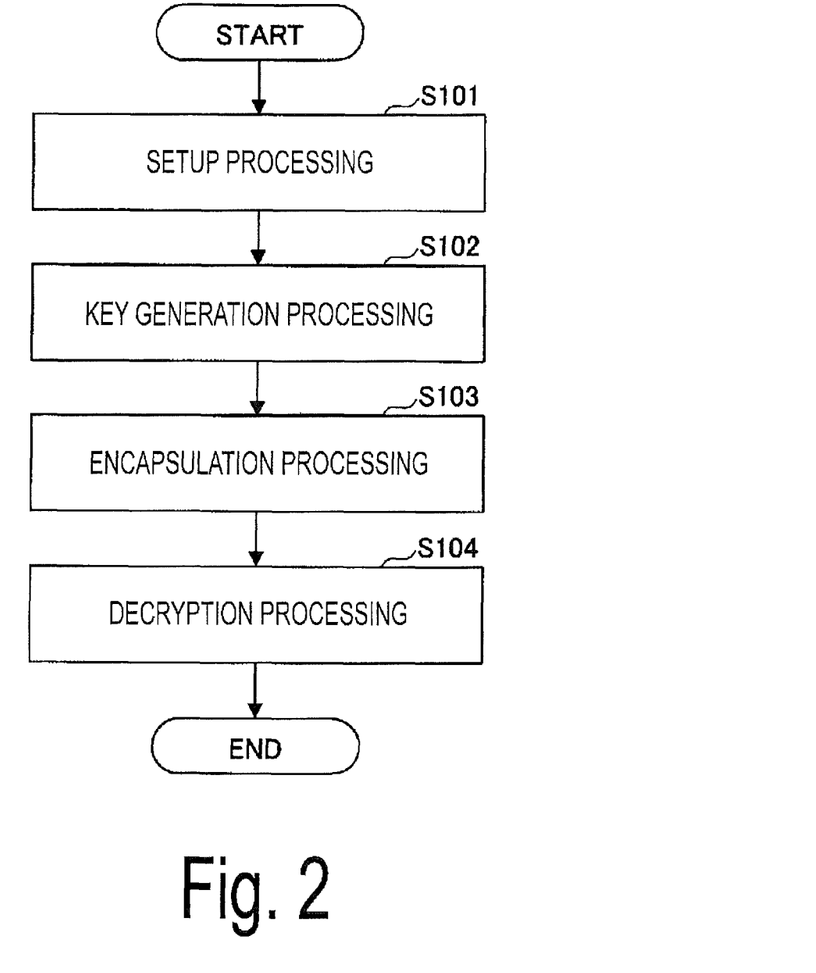
FIG. 2 is a diagram for describing an example of a procedure of processing executed by the ID-based hash proof system configuration apparatus according to the embodiment of the present invention.

With reference to FIG. 2, the following will provide a description of a procedure of processing executed by the ID-based hash proof system configuration apparatus 10 according to the embodiment of the present invention. FIG. 2 is a diagram for describing an example of a procedure of processing executed by the ID-based hash proof system configuration apparatus 10 according to the embodiment of the present invention. Note that the processing of Step S101 (setup processing) to be described later is, for example, executed only once as initial processing performed at the time of configuring the IB-HPS. Further, the processing of Step S102 (key generation processing) to be described later is, for example, executed every single time generation of the private key $sk_{id}$ is performed. Further, the processing of Step S102 (encapsulation processing) to be described later is, for example, executed every single time encapsulation (or wrong encapsulation) is performed. In a similar manner, the processing of Step S103 (decryption processing) to be described later is, for example, executed every single time decryption is performed.

Step S101 (setup processing): The setup unit 101 takes an input of the security parameter $1^\lambda$ to execute $Setup_{HPS}$, and outputs the public parameter pp and the master private key (msk, K).

Step S102 (key generation processing): The key generation unit 102 takes an input of the public parameter pp, the master private key (msk, K), and the identifier id to execute $KeyGen_{HPS}$, and outputs the private key $sk_{id}$.

Step S103 (encapsulation processing): The encapsulation unit 103 takes an input of the public parameter pp and the identifier id to execute $Encap_{HPS}$, and outputs (ct, k). Alternatively, the wrong encapsulation unit 104 takes an input of the public parameter pp and the identifier id to execute $Encap_{HPS}*$, and outputs the wrong ciphertext ct'.

Step S104 (decryption processing): The decryption unit 105 takes an input of the public parameter pp, the private key $sk_{id}$, the identifier id, and the ciphertext ct to execute $Decap_{HPS}$, and outputs the key k.

6. Hardware Configuration of ID-Based Hash Proof System Configuration Apparatus 10

Figure 3:
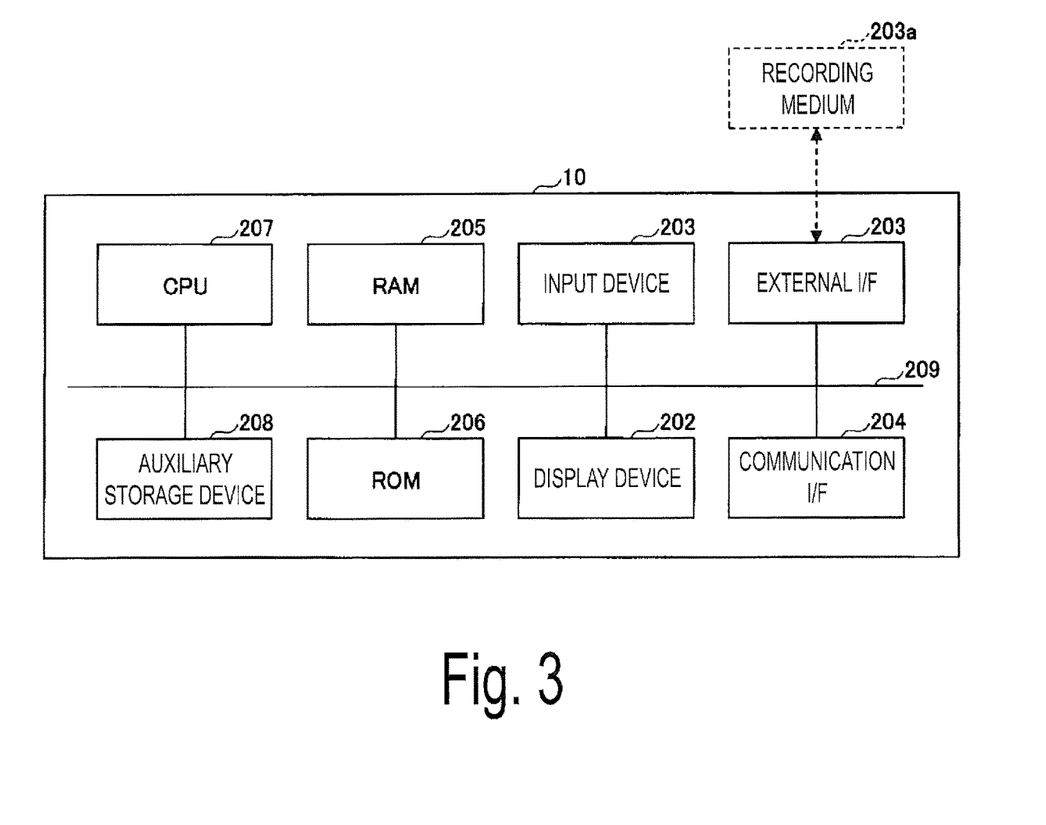
FIG. 3 is a diagram illustrating an example of a hardware configuration of the ID-based hash proof system configuration apparatus according to the embodiment of the present invention.

With reference to FIG. 3, the following will provide a description of a hardware configuration of the ID-based hash proof system configuration apparatus 10 according to the embodiment of the present invention. FIG. 3 is a diagram illustrating an example of a hardware configuration of the ID-based hash proof system configuration apparatus 10 according to the embodiment of the present invention.

As illustrated in FIG. 3, the ID-based hash proof system configuration apparatus 10 according to the embodiment of the present invention includes an input device 201, a display device 202, an external I/F 203, a communication I/F 204, a random access memory (RAM) 205, a read only memory (ROM) 206, a central processing unit (CPU) 207, and an auxiliary storage device 208. Each of these pieces of hardware is communicably connected to each other via a bus 209.

The input device 201 is, for example, a keyboard, a mouse, a touch panel, and the like, and is used by a user to input various operations. The display device 202 is, for example, a display and the like, and displays processing results of the ID-based hash proof system configuration apparatus 10. Note that the ID-based hash proof system configuration apparatus 10 need not necessarily include at least one of the input device 201 and the display device 202.

The external I/F 203 is an interface for establishing connection with an external apparatus. Examples of the external apparatus include a recording medium 203a, or the like. The ID-based hash proof system configuration apparatus 10 can read and write data from and to the recording medium 203a and the like via the external I/F 203. The recording medium 203a may store, for example, one or more programs for implementing each of the functional units (for example, the setup unit 101, the key generation unit 102, the encapsulation unit 103, the wrong encapsulation unit 104, and the decryption unit 105) included in the ID-based hash proof system configuration apparatus 10.

Examples of the recording medium 203a include a flexible disk, a Compact Disc (CD), a Digital Versatile Disk (DVD), a Secure Digital memory card (SD memory card), a Universal Serial Bus (USB) memory card, or the like.

The communication I/F 204 is an interface for connecting the ID-based hash proof system configuration apparatus 10 to a communication network. The one or more programs for implementing each of the functional units included in the ID-based hash proof system configuration apparatus 10 may be acquired (downloaded) from a predetermined server or the like via the communication I/F 204.

The RAM 205 is a volatile semiconductor memory that temporarily stores programs and data. The ROM 206 is a non-volatile semiconductor memory that can store programs and data even after power is turned off. The ROM 206 stores, for example, configuration information related to an operating system (OS), configuration information related to a communication network, and the like.

The CPU 207 is an arithmetic apparatus that reads programs and data from the ROM 206, the auxiliary storage device 208, or the like, stores the read programs and data in the RAM 205, and executes processing. Each of the functional units included in the ID-based hash proof system configuration apparatus 10 is, for example, implemented through the processing in which the one or more programs stored in the auxiliary storage device 208 are executed by the CPU 207.

The auxiliary storage device 208 is, for example, a hard disk drive (HDD), a solid state drive (SSD), or the like, and is a non-volatile storage device that stores programs and data. The programs and data stored in the auxiliary storage device 208 include an OS, application programs, one or more programs for implementing each of the functional units included in the ID-based hash proof system configuration apparatus 10, or the like.

Because the ID-based hash proof system configuration apparatus 10 according to the embodiment of the present invention includes the hardware configuration illustrated in FIG. 3, the ID-based hash proof system configuration apparatus. 10 can implement various types of processing described above. Note that FIG. 3 illustrates a hardware configuration example of a case in which the ID-based hash proof system configuration apparatus 10 is implemented by a single computer. However, this configuration is not restrictive, and the ID-based hash proof system configuration apparatus 10 may be implemented by a plurality of computers.

7. Supplement

As described above, the ID-based hash proof system configuration apparatus 10 according to the embodiment of the present invention configures the IB-HPS by means of the MIBE that is configured by using the IPE. Owing to this configuration, the ID-based hash proof system configuration apparatus 10 according to the embodiment of the present invention can configure the IB-HPS having an optimal universality-ratio without using a random oracle.

Therefore, through the use of the ID-based hash proof system configuration apparatus 10 according to the embodiment of the present invention, the ID-based encryption having an optimal key leakage-ratio can be configured without using a random oracle. In other words, with the ID-based encryption being configured using the IB-HPS that is configured by using the ID-based hash proof system configuration apparatus 10 according to the embodiment of the present invention, an apparatus (ID-based encryption apparatus) that implements the ID-based encryption can be configured. Note that, in this case, the ID-based hash proof system configuration apparatus 10 and the ID-based encryption apparatus may be different apparatuses, or may be the same apparatus.

The present invention is not limited to the above-described embodiment specifically disclosed, and various modifications and changes can be made without departing from the scope of the claims.

REFERENCE SIGNS LIST

10 ID-based hash proof system configuration apparatus
101 Setup unit
102 Key generation unit
103 Encapsulation unit
104 Wrong encapsulation unit
105 Decryption unit

The invention claimed is:

1. An ID-based hash proof system configuration apparatus comprising:
   a processor; and
   a memory storing program instructions that cause the processor to
   receive an input of a security parameter $1^\lambda$, and output a public parameter pp and a master private key (msk, K) by using a setup algorithm $\text{Setup}_{MIBE}$ and a key K, the setup algorithm $\text{Setup}_{MIBE}$ including a setup algorithm $\text{Setup}_{IPE}$ for inner-product encryption, the key K being randomly selected from a key space of a pseudorandom function PRF;
   receive an input of the public parameter pp, the master private key (msk, K), and an identifier id, and output a private key $\text{sk}_{id} = (\text{sk}_{id}', \{r_i\}_{i \in [n]})$ by using a bit value $r_i$ ($1 \le i \le n$) that is selected, a key generation algorithm $\text{KeyGen}_{MIBE}$, and the pseudorandom function PRF, the bit value $r_i$ ($1 \le i \le n$) being one of n bit values $r_i$ ($1 \le i \le n$) randomly selected from $\{0, 1\}$, the key generation algorithm $\text{KeyGen}_{MIBE}$ including a key generation algorithm $\text{KeyGen}_{IPE}$ for the inner-product encryption, the private key $\text{sk}_{id} = (\text{sk}_{id}', \{r_i\}_{i \in [n]})$ being configured by using an output $\text{sk}_{id}'$ of the key generation algorithm $\text{KeyGen}_{MIBE}$ and the bit value $r_i$ ($1 \le i \le n$);
   receive an input of the public parameter pp and the identifier id, and output a ciphertext ct and the key k by using an encryption algorithm $\text{Enc}_{MIBE}$ including an encryption algorithm $\text{Enc}_{IPE}$ for the inner-product encryption;
   receive an input of the public parameter pp and the identifier id, and output a wrong ciphertext ct' by using the encryption algorithm $\text{Enc}_{MIBE}$; and
   receive an input of the public parameter pp, the private key $\text{sk}_{id}$, the identifier id, and the ciphertext ct, and output the key k by using a decryption algorithm $\text{Dec}_{MIBE}$ including a decryption algorithm $\text{Dec}_{IPE}$ for the inner-product encryption,
   wherein the setup algorithm $\text{Setup}_{MIBE}$ inputs the security parameter $1^\lambda$ and an ID multiplicity $1^{n+1}$ to the setup algorithm $\text{Setup}_{IPE}$, and thereby generates the public parameter pp and a partial key msk, the public parameter pp specifying an (n+1)-dimensional vector space, the partial key msk being included in the master private key (msk, K), n+1 of the ID multiplicity $1^{n+1}$ being defined by adding 1 to a number of the n bit values, and n+1 of the ID multiplicity $1^{n+1}$ is a number of dimensions of the (n+1)-dimensional vector space.

2. The ID-based hash proof system configuration apparatus according to claim 1, wherein
the key generation algorithm KeyGen$_{MIBE}$ calculates an (n+1)-dimensional vector y so that the (n+1)-dimensional vector y satisfies a predetermined expression determined based on the bit value $r_i$ (1≤i≤n) and the identifier id with respect to a variable X, inputs the (n+1)-dimensional vector y, the public parameter pp, the partial key msk that is included in the master private key (msk, K), and a function value of the pseudorandom function PRF to the key generation algorithm KeyGen$_{IPE}$, and thereby generates the sk$_{id}$', a number of dimensions of the (n+1)-dimensional vector v being defined by adding 1 to a number of the n bit values.

3. The ID-based hash proof system configuration apparatus according to claim 1, wherein
the outputting of the ciphertext ct by using the encryption algorithm Enc$_{MIBE}$ includes inputting the public parameter pp and an (n+1)-dimensional vector determined based on the identifier id to the encryption algorithm Enc$_{IPE}$, to generate the ciphertext ct, a number of dimensions of the (n+1)-dimensional vector determined based on the identifier id being defined by adding 1 to a number of the n bit values.

4. The ID-based hash proof system configuration apparatus according to claim 1, wherein
the decryption algorithm Dec$_{MIBE}$ decomposes the private key sk$_{id}$ into (sk$_{id}$',{r}$_{i\in[n]}$) and decomposes the ciphertext ct into {ct$_{i,b}$}$_{i\in[n], b\in\{0,1\}}$, calculates an (n+1)-dimensional vector y so that the (n+1)-dimensional vector y satisfies a predetermined expression being determined based on the bit value $r_i$ (1≤i≤n) and the identifier id with respect to a variable X, inputs the sk$_{id}$', the (n+1)-dimensional vector y, the public parameter pp, and the ct$_{i,b}$ to the decryption algorithm Dec$_{IPE}$, and thereby generates the key k, a number of dimensions of the (n+1)-dimensional vector y being defined by adding 1 to a number of the n bit values.

5. An ID-based hash proof system configuration method performed by a computer, the method comprising:
receiving an input of a security parameter $1^\lambda$, and outputting a public parameter pp and a master private key (msk, K) by using a setup algorithm Setup$_{MIBE}$ and a key K, the setup algorithm Setup$_{MIBE}$ including a setup algorithm Setup$_{MIBE}$ for inner-product encryption, the key K being randomly selected from a key space of a pseudorandom function PRF;

receiving an input of the public parameter pp, the master private key (msk, K), and an identifier id, and outputting a private key sk$_{id}$=(sk$_{id}$',{r$_i$}$_{i\in[n]}$) by using a bit value $r_i$ (1≤i≤n) that is selected, a key generation algorithm KeyGen$_{MIBE}$, and the pseudorandom function PRF, the bit value $r_i$ (1≤i≤n) being one of n bit values $r_i$ (1≤i≤n) randomly selected from {0, 1}, the key generation algorithm KeyGen$_{MIBE}$ including a key generation algorithm KeyGen$_{IPE}$ for the inner-product encryption, the private key sk$_{id}$=(sk$_{id}$',{r$_i$}$_{i\in[n]}$) being configured by using an output sk$_{id}$' of the key generation algorithm KeyGen$_{MIBE}$ and the bit value $r_i$ (0≤i≤n);

receiving an input of the public parameter pp and the identifier id, and outputting a ciphertext ct and a key k by using an encryption algorithm Enc$_{MIBE}$ including an encryption algorithm Enc$_{IPE}$ for the inner-product encryption;

receiving an input of the public parameter pp and the identifier id, and outputting a wrong ciphertext ct' by using the encryption algorithm Enc$_{MIBE}$; and receiving an input of the public parameter pp, the private key sk$_{id}$, the identifier id, and the ciphertext ct, and outputting the key k by using a decryption algorithm Dec$_{MIBE}$ including a decryption algorithm Dec$_{IPE}$ for the inner-product encryption, wherein the setup algorithm Setup$_{MIBE}$ inputs the security parameter $1^\lambda$ and an ID multiplicity $1^{n+1}$ to the setup algorithm Setup$_{IPE}$, and thereby generates the public parameter pp and a partial key msk, the public parameter pp specifying an (n+1)-dimensional vector space, the partial key msk being included in the master private key (msk, K), n+1 of the ID multiplicity $1^{n+1}$ is defined by adding 1 to a number of the n bit values, and n+1 of the ID multiplicity $1^{n+1}$ is a number of dimensions of the (n+1)-dimensional vector space.

6. A non-transitory computer-readable storage medium that stores a program comprising program instructions for causing a processor to perform a process comprising:

receiving an input of a security parameter $1^\lambda$, and outputting a public parameter pp and a master private key (msk, K) by using a setup algorithm SetUp$_{MIBE}$ and a key K, the setup algorithm Setup$_{MIBE}$ including a setup algorithm Setup$_{IPE}$ for inner-product encryption, the key K being randomly selected from a key space of a pseudorandom function PRF;

receiving an input of the public parameter pp, the master private key (msk, K), and an identifier id, and outputting a private key sk$_{id}$=(sk$_{id}$',{r$_i$}$_{i\in[n]}$) by using a bit value $r_i$ (1≤i≤n) that is selected, a key generation algorithm KeyGen$_{MIBE}$, and the pseudorandom function PRF, the bit value $r_i$ (1≤i≤n) being one of n bit values $r_i$ (1≤i≤n) randomly selected from {0, 1}, the key generation algorithm KeyGen$_{MIBE}$ including a key generation algorithm KeyGen$_{IPE}$ for the inner-product encryption, the private key sk$_{id}$=(sk$_{id}$', {r$_i$}$_{i\in[n]}$) being configured by using an output sk$_{id}$' of the key generation algorithm KeyGen$_{MIBE}$ and the bit value $r_i$ (1≤i≤n);

receiving an input of the public parameter pp and the identifier id, and outputting a ciphertext ct and a key k by using an encryption algorithm EnC$_{MIBE}$ including an encryption algorithm Enc$_{IPE}$ for the inner-product encryption;

receiving an input of the public parameter pp and the identifier id, and outputting a wrong ciphertext ct' by using the encryption algorithm Enc$_{MIBE}$; and receiving an input of the public parameter pp, the private key sk$_{id}$, the identifier id, and the ciphertext ct, and outputting the key k by using a decryption algorithm Dec$_{MIBE}$ including a decryption algorithm Dec$_{IPE}$ for the inner-product encryption, wherein the setup algorithm $\text{Setup}_{MIBE}$, inputs the security parameter $1^\lambda$ and an ID multiplicity $1^{n+1}$ to the setup algorithm $\text{Setup}_{IPE}$, and thereby generates the public parameter pp and a partial key msk, the public parameter pp specifying an (n+1)-dimensional vector space, the partial key msk being included in the master private key (msk, K), n+1 of the ID multiplicity $1^{n+1}$ is defined by adding 1 to a number of the n bit values, and n+1 of the ID multiplicity $1^{n+1}$ is a number of dimensions of the (n+1)-dimensional vector space.

* * * * *